US011002196B2

(12) United States Patent
Godel et al.

(10) Patent No.: US 11,002,196 B2
(45) Date of Patent: May 11, 2021

(54) COMBUSTION CHAMBER COMPRISING TWO TYPES OF INJECTORS IN WHICH THE SEALING MEMBERS HAVE A DIFFERENT OPENING THRESHOLD

(71) Applicant: SAFRAN AIRCRAFT ENGINES, Paris (FR)

(72) Inventors: Guillaume Aurélien Godel, Moissy-Cramayel (FR); Christophe Chabaille, Moissy-Cramayel (FR); Thomas Olivier Marie Noel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 93 days.

(21) Appl. No.: 16/281,308

(22) Filed: Feb. 21, 2019

(65) Prior Publication Data

US 2019/0257251 A1 Aug. 22, 2019

(30) Foreign Application Priority Data

Feb. 22, 2018 (FR) ...................... 18 51551

(51) Int. Cl.
*F02C 9/28* (2006.01)
*F02C 7/262* (2006.01)
(Continued)

(52) U.S. Cl.
CPC ................ *F02C 9/28* (2013.01); *F02C 7/228* (2013.01); *F02C 7/232* (2013.01); *F02C 7/262* (2013.01);
(Continued)

(58) Field of Classification Search
CPC ...... F23R 3/28; F23R 3/34; F23R 3/50; F23R 3/346; F02C 7/22; F02C 7/228;
(Continued)

(56) References Cited

U.S. PATENT DOCUMENTS 4,817,389 A 4/1989 Holladay et al.
5,167,122 A 12/1992 Shekleton
(Continued)

FOREIGN PATENT DOCUMENTS

EP 2056023 A1 4/2015
FR 2943119 A1 3/2011
(Continued)

OTHER PUBLICATIONS

Search Report issued in French Patent Application No. 18 51551 dated Aug. 13, 2018.
(Continued)

*Primary Examiner* — Scott J Walthour
*Assistant Examiner* — David P. Olynick
(74) *Attorney, Agent, or Firm* — Pearne & Gordon LLP

(57) ABSTRACT

The invention relates to a combustion chamber for a turbomachine. The combustion chamber comprises at least one spark plug, at least one fuel injector of a first type of injector that is located facing the spark plug, and at least one fuel injector of a second type. Each fuel injector comprises a mobile sealing member that is configured to open when the fuel pressure exceeds an opening threshold. The opening threshold of the mobile sealing member of the injector of the first type is strictly less than the opening threshold of the mobile sealing member of the injector of the second type.

15 Claims, 5 Drawing Sheets

(51) Int. Cl.
| | |
|---|---|
| *F02C 7/266* | (2006.01) |
| *F23R 3/14* | (2006.01) |
| *F23D 23/00* | (2006.01) |
| *F23R 3/34* | (2006.01) |
| *F02C 7/232* | (2006.01) |
| *F23R 3/28* | (2006.01) |
| *F23K 5/14* | (2006.01) |
| *F23R 3/50* | (2006.01) |
| *F02C 7/264* | (2006.01) |
| *F02C 7/228* | (2006.01) |
| *F02C 9/34* | (2006.01) |

(52) U.S. Cl.
CPC .............. *F02C 7/264* (2013.01); *F02C 7/266* (2013.01); *F02C 9/34* (2013.01); *F23D 23/00* (2013.01); *F23K 5/147* (2013.01); *F23R 3/14* (2013.01); *F23R 3/28* (2013.01); *F23R 3/34* (2013.01); *F23R 3/50* (2013.01); *F23D 2207/00* (2013.01); *F23K 2203/105* (2013.01); *F23K 2300/206* (2020.05)

(58) Field of Classification Search
CPC .......... F02C 7/232; F02C 7/262; F02C 7/264; F02C 7/266; F23K 5/147; F23K 2900/05141; F23D 11/26
See application file for complete search history.

(56) References Cited

U.S. PATENT DOCUMENTS

| | | | |
|---|---|---|---|
| 5,402,634 A | 4/1995 | Marshall | |
| 6,758,043 B2* | 7/2004 | Michau | F23K 5/147 |
| | | | 137/118.06 |
| 2003/0093998 A1* | 5/2003 | Michau | F23K 5/147 |
| | | | 60/740 |
| 2009/0107148 A1* | 4/2009 | Pieussergues | F02C 9/263 |
| | | | 60/739 |
| 2009/0173810 A1* | 7/2009 | Rodrigues | F02C 7/232 |
| | | | 239/533.3 |
| 2010/0229559 A1* | 9/2010 | Lains | F02C 7/266 |
| | | | 60/740 |
| 2012/0324895 A1 | 12/2012 | Ogata et al. | |
| 2013/0067919 A1* | 3/2013 | Ogata | F02C 7/228 |
| | | | 60/734 |
| 2013/0118181 A1* | 5/2013 | Pieussergues | F23N 1/002 |
| | | | 60/776 |
| 2015/0377059 A1 | 12/2015 | Debbouz et al. | |
| 2017/0234539 A1 | 8/2017 | Chabaille et al. | |
| 2017/0292491 A1* | 10/2017 | Thiriet | F02C 7/264 |
| 2018/0003385 A1 | 1/2018 | Rodrigues et al. | |

FOREIGN PATENT DOCUMENTS

| | | |
|---|---|---|
| FR | 3011619 A1 | 4/2015 |
| FR | 3027059 A1 | 4/2016 |
| WO | 2014135797 A1 | 9/2014 |

OTHER PUBLICATIONS

Application document as-filed for patent application entitled: Housing of a Gasket for a Turbomachine Injector, U.S. Appl. No. 16/304,406, filed May 29, 2017.

Application document as-filed for patent application entitled: Chamber Between an Inlet Nozzle and an Obturator, for a Turbomachine, U.S. Appl. No. 16/304,415, filed May 29, 2017.

* cited by examiner

COMBUSTION CHAMBER COMPRISING TWO TYPES OF INJECTORS IN WHICH THE SEALING MEMBERS HAVE A DIFFERENT OPENING THRESHOLD

TECHNICAL FIELD

The invention relates to the general technical field of aircraft turbomachines such as turbojet engines and turboprop engines. It relates to a combustion chamber for a turbomachine, comprising at least one spark plug, an injector of a first type and an injector of a second type.

PRIOR ART

An annular combustion chamber of a turbomachine comprises two coaxial walls of revolution which extend one inside the other and which are connected to each other at their upstream ends by a chamber-back annular wall.

The chamber-back wall comprises openings for mounting injection systems into which fuel injectors are inserted.

The combustion chamber comprises at least one spark plug that is configured to start the combustion of a mixture of air and of fuel in the combustion chamber.

At altitude, the low pressures, the low temperatures and the variations in the viscosity of the fuel, make the reignition of the combustion chamber during flight more difficult.

In a known manner, the combustion chamber comprises injectors of a first type that are closest to the spark plugs, and injectors of a second type that are farther from the spark plugs.

The injectors of the first type are configured to inject a flow rate of fuel greater than that of the injectors of the second type. The injectors of the first type are also configured to generate a cloud of mixture of air and fuel with a spray cone angle greater than that of the cloud of fuel generated by the injectors of the second type. The ignition and/or the re-ignition during flight of the combustion chamber are facilitated. Such a combustion chamber is for example known from the patent application FR 2 943 119.

Nevertheless, there is a need to further facilitate the re-ignition of the combustion chamber during flight, with, if possible, a more homogenous distribution of the fuel in the combustion chamber and while limiting the temperature heterogeneities in the combustion chamber.

DISCLOSURE OF THE INVENTION

The invention aims to at least partially solve the problems encountered in the solutions of the prior art.

In this respect, the object of the invention is a combustion chamber for a turbomachine. The combustion chamber comprises at least one spark plug, at least one fuel injector of a first type, and at least one fuel injector of a second type.

The injector of the first type is located facing the spark plug. The injector of the second type is farther away from the plug than the injector of the first type.

Each fuel injector comprises an opening for intake of fuel, a first fuel outlet, a mobile sealing member, and a first elastic return means.

The mobile sealing member is configured to be mobile between an open position in which it lets fuel pass through in the direction of the first outlet and a closed position in which it plugs the intake opening. The mobile sealing member is configured to open when the fuel pressure exceeds an opening threshold of the mobile sealing member.

The first elastic return means is configured to stress the mobile sealing member towards its closed position.

According to the invention, the opening threshold of the mobile sealing member of the injector of the first type, called first opening threshold, is strictly less than the opening threshold of the mobile sealing member of the injector of the second type, called second opening threshold.

Via the injector of the first type, the re-ignition of the combustion chamber during flight is facilitated, in particular at altitude.

The difference in pressure between the pressure of the fuel arriving in the injector of the first type and the pressure of the fuel exiting this injector tends to increase, which tends to reduce the size of the drops of the injected fuel. This results in a better mixture of air and of fuel injected into the combustion chamber. The re-ignition of the combustion chamber during flight is thus facilitated.

The opening threshold of the sealing member of the injector of the first type is lowered with respect to the opening threshold of the sealing member of the injector of the second type, instead of lowering the opening threshold of the sealing member of all the injectors. Since the number of injectors of the first type is much smaller than that of the injectors of the second type, the negative effect of the invention on the system for supplying fuel to the injectors is limited.

The invention can optionally comprise one or more of the following features in combination with each other or not.

According to one particularity of implementation, the injector of the first type and/or of the injector of the second type comprises a second fuel outlet, a mobile dosing member, and a second elastic return means configured to stress the mobile dosing member towards its closed position.

The mobile dosing member is configured to be mobile between an open position in which it lets fuel pass through in the direction of the second outlet and a closed position in which it prevents the circulation of fuel towards the second outlet. The mobile dosing member is configured to open when the fuel pressure exceeds an opening threshold of the mobile dosing member that is greater than the opening threshold of the mobile sealing member of the injector. The first outlet fluidly communicates with a primary circuit of the injector, the second outlet fluidly communicating with a secondary circuit of the injector.

According to one particularity of implementation, the mobile sealing member of the injector of the first type and/or the injector of the second type is configured to be open when the pressure of the fuel is greater than the opening threshold of the mobile sealing member of the injector, in order to allow the fuel to supply the primary circuit through the first outlet. The mobile dosing member of the injector is configured to be open when the pressure of the fuel is greater than the opening threshold of the mobile dosing member, in order to allow the fuel to supply the secondary circuit of the injector through the second outlet.

The difference in pressure between the pressure of the fuel arriving in the injector of the first type and the pressure of the fuel exiting this injector when the mobile dosing member is in the open position tends to increase, which tends to reduce the size of the drops of the fuel injected and to facilitate the re-ignition of the combustion chamber during flight.

According to one particularity of implementation, the first elastic return means of the injector of the first type has a stiffness lower than the stiffness of the first elastic return means of the injector of the second type.

Preferably, the first elastic return means comprises a spring. Preferably, the second elastic return means comprises a spring.

Preferably, the first elastic return means and the second elastic return means are arranged in parallel, that is to say around the same longitudinal axis of the injector.

According to one particularity of implementation, the injector of the first type and/or the injector of the second type comprises an outer envelope. The mobile dosing member is at least partly constrained to move with the mobile sealing member by forming, with the mobile sealing member, a mobile unit with respect to the outer envelope.

Preferably, the mobile dosing member is fastened to the mobile sealing member. Preferably and alternatively, the mobile dosing member is made from a single piece with the mobile sealing member.

According to one particularity of implementation, the opening threshold of the dosing member of the injector of the first type is identical to the opening threshold of the dosing member of the injector of the second type.

According to one particularity of implementation, the injector of the first type is configured to inject, in a steady state, a flow rate of fuel that is substantially identical to the flow rate of fuel injected by the injector of the second type.

The distribution of the air-fuel mixture thus tends to be more homogenous in the combustion chamber, which tends to limit the temperature heterogeneities in the combustion chamber, while facilitating the re-ignition of the combustion chamber during flight.

According to one particularity of implementation, the ratio of the value of the second opening threshold to the value of the first opening threshold is between 1.03 and 1.10.

According to one particularity of implementation, the injector of the first type is configured to inject fuel in a cloud having a spray cone angle that is substantially equal to a spray cone angle of a cloud of fuel intended to be injected by the injector of the second type.

The distribution of the air-fuel mixture thus tends to be more homogenous in the combustion chamber, which tends to limit the temperature heterogeneities in the combustion chamber, while facilitating the re-ignition of the combustion chamber during flight.

According to one particularity of implementation, the combustion chamber comprises a first injection system into which the injector of the first type is inserted, and a second injection system into which the injector of the second type is inserted. Each injection system comprises at least one air swirler and a dome. The first injection system is substantially identical to the second injection system.

The invention also relates to a turbomachine comprising a combustion chamber as defined above. Preferably, the turbomachine is an aircraft turbomachine.

BRIEF DESCRIPTION OF THE DRAWINGS

The present invention will be better understood upon reading the description of examples of implementation, given purely for informational purposes and in no way limiting, while referring to the appended drawing in which.

DETAILED DISCLOSURE OF SPECIFIC EMBODIMENTS

Identical, similar or equivalent portions of the various drawings have the same reference numbers so as to facilitate the passage from one drawing to another.

Figure 1:
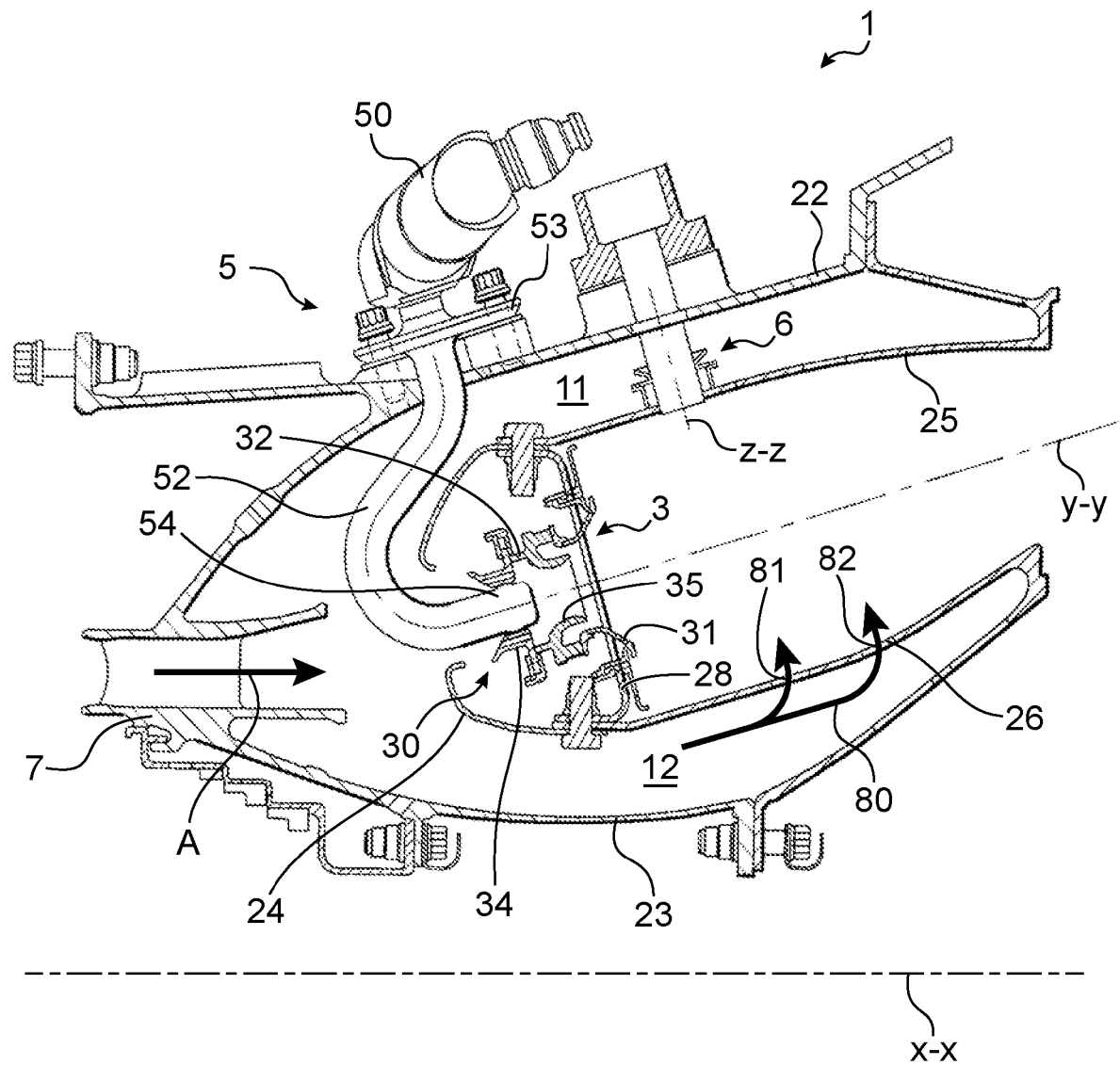
FIG. 1 is a partial schematic view of a longitudinal half-section of a combustion chamber of a turbomachine, according to the invention.

FIG. 1 schematically shows a combustion chamber 2 of an aircraft turbomachine. The combustion chamber 2 is annular around a longitudinal axis X-X of the turbomachine.

It comprises an outer casing wall 22 and an inner casing wall 23, a fairing 24, an outer wall 25 and an inner wall 26 which are connected by a chamber back 28.

It also comprises at least one spark plug 6, injectors 5a (FIG. 5) of a first type of injectors that are located facing the spark plugs 6, injectors 5b (FIG. 5) of a second type of injectors that are farther away from the plugs 6, injection systems 3 and a diffuser 7.

The outer casing wall 22 defines the combustion chamber 2 radially to the outside with respect to the longitudinal axis X-X of the turbomachine. The inner casing wall 23 defines the combustion chamber 2 radially towards the inside with respect to the longitudinal axis X-X of the turbomachine.

The outer casing wall 22 defines, with the outer wall 25, a first passage 11 for flow of air. Likewise, the inner casing wall 23 defines, with the inner chamber wall 26, a second passage 12 for flow of air.

Throughout the disclosure, a longitudinal direction is a direction that is substantially parallel to the longitudinal axis X-X of the turbomachine. A radial direction is a direction that is substantially orthogonal to the longitudinal axis X-X of the turbomachine and which intersects this axis. A circumferential direction is a direction around the longitudinal axis X-X of the turbomachine.

An "upstream" direction and the "downstream" direction are defined by the general direction of flow of the air and of the fuel in the combustion chamber 2. This direction also substantially corresponds to the general direction of flow of the exhaust gases in the turbomachine.

The outer wall 25 and the inner wall 26 are walls of revolution that are coaxial around the longitudinal turbomachine axis X-X, while being symmetrical with respect to a longitudinal axis Y-Y of the injection system 3 that is shown in FIG. 1. They each comprise primary orifices 81 for introduction of a flow of primary air and dilution orifices 82 for introduction of a flow of bypass air into the combustion chamber 2.

The fairing 24 extends upstream from the outer wall 25 and the inner wall 26 while being located upstream of the chamber back 28. It comprises central openings for housing the injections systems 3 and the corresponding injectors 5.

The chamber back 28 comprises openings for mounting the injection systems 3 into which the fuel injectors 5 are inserted.

Each spark plug 6 is mounted through the outer wall 25 of the combustion chamber. It extends transversely to this wall while having its longitudinal axis Z-Z that is substantially orthogonal to the longitudinal axis Y-Y of the injection system 3 of the injector 5a of the first type that is located near this plug 6.

The spark plug 6 is used to ignite the cloud of mixture of air and of fuel produced by the injector 5a of the first type, in order for the flame to then propagate to the neighbouring clouds of mixture of air and of fuel that are produced by the fuel injectors 5b of the second type, in order to ignite the combustion chamber 2.

The injection systems 3 are mounted on the chamber back 28 while being spaced apart from each other in a circumferential direction.

Each injection system 3 comprises, from upstream to downstream, a sliding passage 34, a swirler 32, a venturi 35, and a dome 31. The sliding passage 34, the swirler 32 and the dome 31 together form means 30 for supplying air in order to produce a cloud of air-fuel mixture with the fuel injected by the corresponding injector 5.

In the embodiment shown, the injection systems 3 of the injectors 5a of the first type are substantially identical to the injection systems 3 of the injectors 5b of the second type.

Each injection system 3 is connected to one of the fuel injectors 5 that is mounted in the sliding passage 34 at the level of an injector nozzle. The sliding passage 34 can comprise holes for supplying air.

The swirler 32 is rigidly connected to the dome 31. It generally comprises a first stage of blades and a second stage of blades, the function of which is to drive the air in rotation around the axis Y-Y of the injection system 3. The blades of the first stage of blades of the swirler 32 can rotate in the same direction or in the opposite direction as those of the second stage of blades of the swirler 32.

The dome 31 has a flared shape substantially of revolution around the longitudinal axis Y-Y of the injection system 3. It comprises through-holes for supplying the combustion chamber 2 with air. It is fastened to the chamber back 28.

The diffuser 7 is configured to supply the combustion chamber 2, in particular the injection systems 3, the primary orifices 81 and the dilution orifices 82, with pressurised hot air according to the arrow A.

This pressurised air is used in particular for the combustion or for the cooling of the combustion chamber 2. A portion of this air is introduced into the combustion chamber 2 at the central opening of the fairing 24, while another portion of the air flows towards the passages 11 and 12 for flow of air. The air supplying the injection system 3 flows from the central opening of the fairing 24, through in particular the blades of the swirlers 32 of the injection system shown in FIG. 1 and through-holes of the dome 31. The flow of air sketched by the arrows 80 in the passages 11 and 12 penetrates into the combustion chamber 2 by the primary orifices 81 and the dilution orifices 82.

In joint reference to FIGS. 1 to 5, each injector 5 is of the aeromechanical type, that is to say that the pressure of the fuel inside the injector 5 is used to spray the fuel at the outlet of the injector 5. It comprises a primary fuel circuit intended for example for a phase of ignition and of low power, and a secondary circuit used in the later operational phases, of medium to high power, in addition to the primary circuit.

Figure 2:
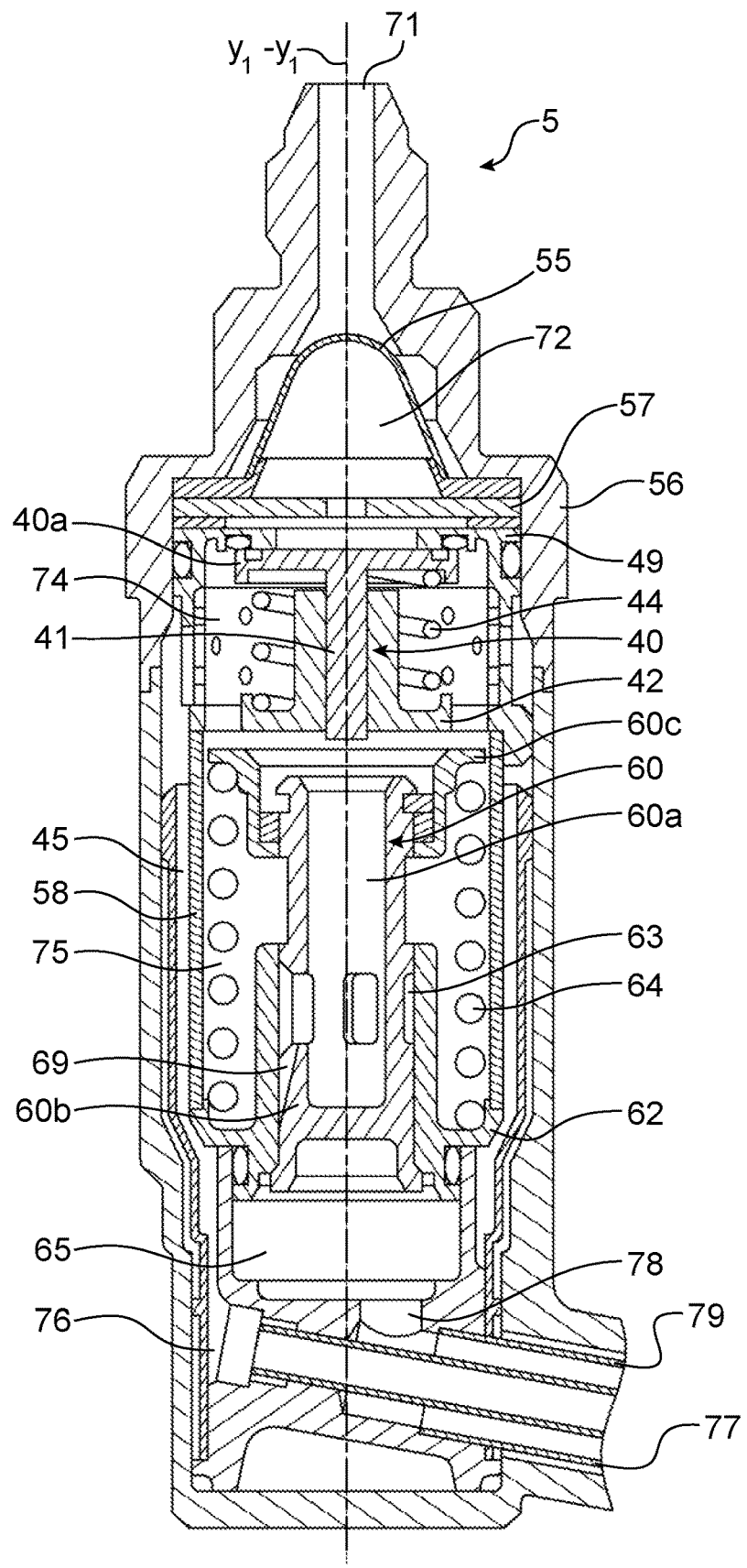
FIG. 2 is a partial schematic view of a longitudinal cross-section of a fuel injector of the combustion chamber according to the invention, the mobile sealing member being in the closed position.
Figure 3:
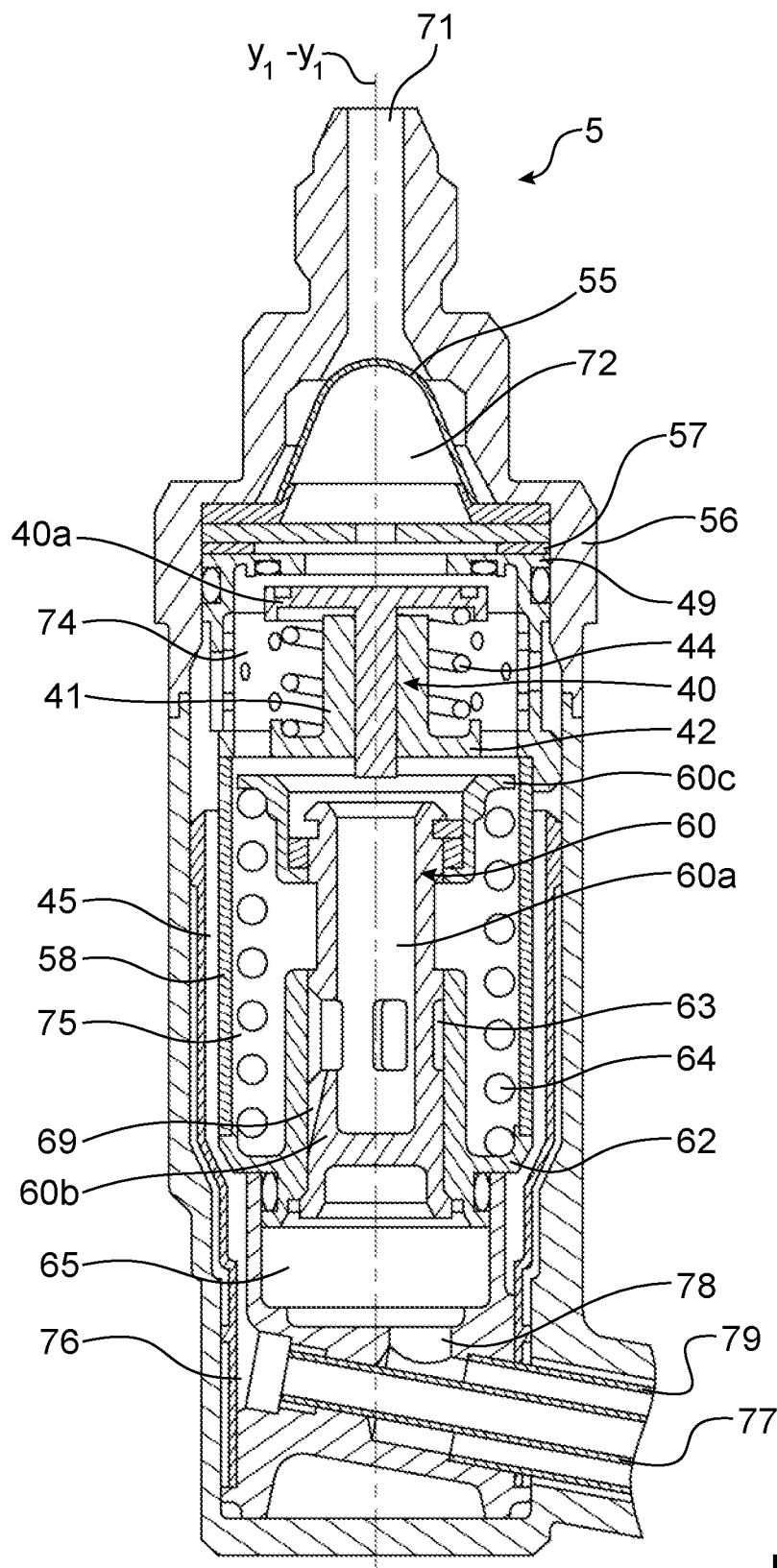
FIG. 3 is a partial schematic view of a longitudinal cross-section of a fuel injector of the combustion chamber according to the invention, the mobile sealing member being in the open position and the mobile dosing member in the closed position.
Figure 4:
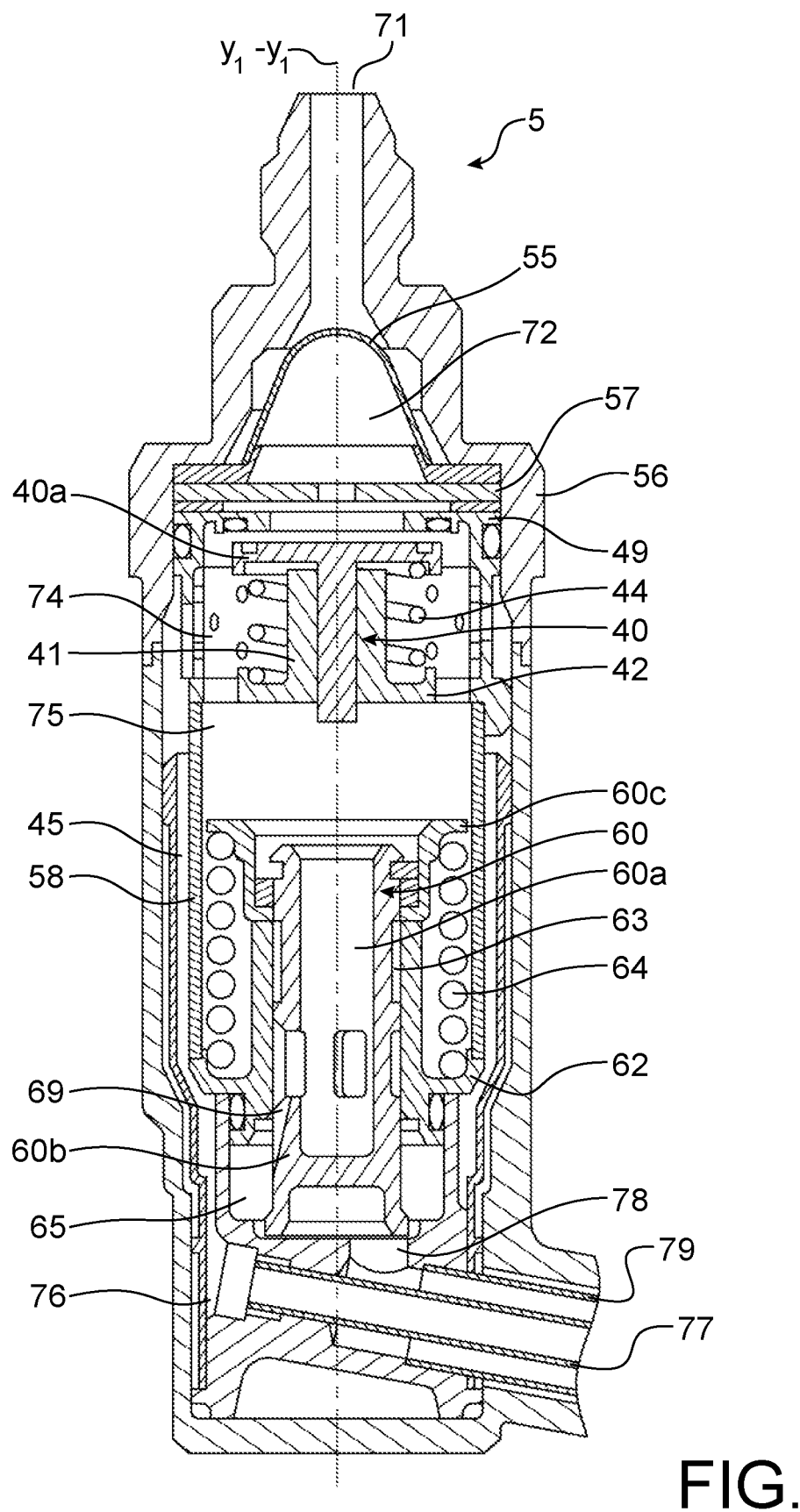
FIG. 4 is a partial schematic view of a longitudinal cross-section of a fuel injector of the combustion chamber according to the invention, the mobile sealing member and the mobile dosing member being in the open position.

Each injector 5 comprises, from upstream to downstream, a body 50, the inside of which is shown in more detail in FIGS. 2 to 4, a fastening plate 53, an injection pipe 52 and an injector nozzle 54.

The fastening plate 53 is used to fasten the injector onto the outer casing wall 22. The injector nozzle 54 comprises a nozzle for spraying the fuel at its end opposite to the injection pipe 52. It is intended to engage with the sliding passage 34. The injection pipe 52 fluidly connects the body 50 of the injector to the injector nozzle 54.

In reference more specifically to FIGS. 2 to 4, the body 50 of the injector comprises a hollow outer envelope 56 that defines the injector radially towards the outside. The body 50 of the injector is of revolution around a longitudinal axis $Y_1$-$Y_1$ of the body 50 of the injector.

The inside of the body 50 comprises an opening 71 for intake of fuel, a screen 55, a diaphragm 57, a mobile sealing member 40, a mobile dosing member 60, a first elastic return means 44, a second elastic return means 64, a first fuel outlet 76, and a second fuel outlet 78.

The inside of the body 50 of the injector comprises a fixed portion that comprises the outer envelope 56, the screen 55, the diaphragm 57, an intermediate body 58 that is located inside the outer envelope 56 while extending like the outer envelope 56 around the longitudinal axis $Y_1$-$Y_1$ of the injector body, a seat 49 of the sealing member, a support 42 of the mobile sealing member, a support 62 of the mobile dosing member, a duct 77 for supplying the primary circuit, and a duct 79 for supplying the secondary circuit.

The mobile sealing member 40, the first elastic return means 44, the mobile dosing member 60 and the second elastic return means 64 are mobile relative to the outer envelope 56, under the effect of the pressure of the fuel in the body 50.

The injector body 50 comprises an intake orifice 71 that forms the intake opening of the injector, an inlet chamber 72, an intake chamber 74, a primary space 45 that is located radially between the intermediate body 58 and the outer envelope 56 relative to the longitudinal axis $Y_1$-$Y_1$ of the injector body, an intermediate chamber 75 that is located radially relative to the longitudinal axis $Y_1$-$Y_1$ between the support 62 of the mobile dosing member and the intermediate body 58, a central recess 60a of the dosing member, at least one dosing slot 69, and a downstream chamber 65.

The intake orifice 71 is an opening for intake of fuel into the injector 5. It is intended to receive the pressurised fuel coming from a fuel pump not shown, this fuel then opens into the inlet chamber 72 after having passed through the filtering screen 55. The diaphragm 57 is placed axially between the inlet chamber 72 and the mobile sealing member 40.

The intake chamber 74 is located downstream of the inlet chamber 72 and it is intended to be separated from the latter by the mobile sealing member 40. The intake chamber 74 fluidly communicates with the primary space 45 that opens into the first outlet 76 or primary outlet. The intake chamber 74 also fluidly communicates with the intermediate chamber 75 and with the central recess 60a of the dosing member.

The primary space 45 fluidly communicates with the first outlet 76 in order to supply the primary circuit of the injector 5.

The mobile sealing member 40 comprises a head 40a and a rod 41. It is a valve that is also known by the name of check valve.

The mobile sealing member 40 is configured to be mobile between an open position in which it lets fuel pass through in the direction of the first outlet 76 and a closed position in which it plugs the intake opening 71.

In the closed position that is shown in FIG. 2, the head 40a of the mobile sealing member bears against its seat 49. In the open position that is shown in FIG. 3 and in FIG. 4, the head 40a of the mobile sealing member is lowered relative to its seat 49 in order to let the fuel pass through in the direction of the intake chamber 74.

The mobile sealing member 40 is configured to open when the fuel pressure exceeds a predetermined opening threshold $S_1$, $S_2$ of the mobile sealing member 40. The mobile sealing member 40 of the injector is configured to be open when the pressure of the fuel is greater than the opening threshold $S_1$, $S_2$ of the mobile sealing member 40 of the injector.

The opening threshold $S_1$ of the mobile sealing member 40 of the injector 5a of the first type, called first opening threshold $S_1$, is strictly lower than the opening threshold $S_2$ of the mobile sealing member 40 of the injector 5b of the second type, called second opening threshold $S_2$.

The ratio of the value of the second opening threshold $S_2$ to the value of the first opening threshold $S_1$ is between 1.03 and 1.10.

The support of the sealing member 42 comprises a tubular portion in which the rod 41 of the mobile sealing member 40 is slidingly mounted. The support of the sealing member 42 rests on the intermediate body 58 which extends downwards and which rests on the support 62 of the mobile dosing member.

The first elastic return means 44 comprises a spring configured to be stressed in compression. This compression spring is helical. The first elastic return means 44 bears on the head 40a of the sealing member and on the support 42 of the sealing member. The first elastic return means 44 is configured to stress the mobile sealing member 40 towards its closed position.

The first elastic return means 44 of the injector 5a of the first type has in particular a stiffness lower than the stiffness of the first elastic return means 44 of the injector 5b of the second type.

The intermediate chamber 75 is located downstream of the intake chamber 74. The intermediate chamber 75 is intended to be separated from the downstream chamber 65 by the mobile dosing member 60. The intermediate chamber 75 fluidly communicates with the central recess 60a of the dosing member and with the dosing slots 69.

The downstream chamber 65 is located downstream of the mobile dosing member 60 and it opens into the second outlet 78 or secondary outlet which supplies the secondary circuit with fuel.

The mobile dosing member 60 further comprises a head 60c and a tubular portion that comprises the central recess 60a, radial openings and a lower side 60b.

The head 60c of the mobile dosing member 60 rests on the second elastic return means 62.

The radial openings open into dosing slots 69. These dosing slots 69 are defined radially with respect to the longitudinal axis $Y_1$-$Y_1$ by the outer surface of the lower side 60b and by the inner surface of the support 62 of the mobile dosing member. The geometry of the slots 69 is such that the cross-sections of passage of the slots 69 vary according to the position of the mobile dosing member 60. In particular, the higher the pressure of the fuel in the central recess 60a, the greater the cross-sections of passage of the slots 69.

The mobile dosing member 60 is configured to be mobile between an open position in which it lets fuel pass through in the direction of the downstream chamber 65 and a closed position in which it plugs the downstream chamber 65.

In the closed position that is shown in FIG. 3, the second elastic return means 64 keeps the lower side 60b bearing against a lower surface of the support 62 of the dosing member. The dosing slots 69 do not open into the downstream chamber 65.

In the open position that is shown in FIG. 4, the head 60c of the mobile dosing member is stopped against an upper surface of the support 62 of the mobile dosing member. The lower side 60b of the mobile dosing member is thus disposed in such a way that the dosing slots 69 open into the downstream chamber 65.

The mobile dosing member 60 is configured to open when the fuel pressure exceeds a predetermined opening threshold $S_3$ of the mobile dosing member 60. The opening threshold $S_3$ of the mobile dosing member 60 is strictly greater than the opening threshold $S_1$, $S_2$ of the mobile sealing member 40 of the corresponding injector. More generally, the opening threshold $S_3$ of the mobile dosing member 60 is in particular strictly greater than the opening threshold $S_1$, $S_2$ of each mobile sealing member 40 of the injectors of the combustion chamber 2. The mobile dosing member 60 is configured to be open when the pressure of the fuel is greater than the opening threshold $S_3$ of the mobile dosing member 60.

The opening threshold $S_3$ of the mobile dosing member of the injector 5a of the first type is substantially identical to the opening threshold $S_3$ of the mobile dosing member 60 of the injector 5b of the second type.

The support 62 of the dosing member comprises a tubular portion, in a central hole 63 of which the lower side 60b of the mobile dosing member 60 is slidingly mounted. The support of the mobile dosing member 62 rests on a base that at least partly defines the downstream chamber 65.

The second elastic return means 64 comprises a spring configured to be stressed in compression. This compression spring is helical. This spring 64 is in contact with the head 60c of the dosing member and it bears on a radial surface of the support of the mobile dosing member 62. It is arranged around the same longitudinal axis $Y_1$-$Y_1$ of the injector body as the first elastic return means 44. The second elastic return means 64 is configured to stress the mobile dosing member 60 towards its closed position.

The second elastic return means 64 of the injector 5a of the first type has in particular a stiffness substantially identical to the stiffness of the second elastic return means 64 of the injector 5b of the second type.

The second outlet 78 opens into an outer duct 79 that is a duct for supplying fuel to the secondary circuit of the injector 5.

The first outlet 76 opens into an inner duct 77 that is a duct for supplying fuel to the primary circuit of the injector 5. This inner duct 77 is located inside the supply duct 79 of the secondary circuit. The annular space that is created between the two ducts 77, 79 is intended to be supplied by fuel that supplies the secondary circuit.

During operation, there can be several cases. In a first case, the pressure of the fuel in the inlet chamber 72 is less than the opening threshold $S_1$, $S_2$ of the mobile sealing member 40. The mobile sealing member 40 is then maintained in the closed position by the return spring 44 and the fuel flows neither through the first outlet 76 nor through the second outlet 78.

In a second case, corresponding to a phase of ignition or of operation at low speed, the pressure of the fuel in the inlet chamber 72 is greater than the opening threshold $S_1$, $S_2$ of the mobile sealing member 40, but the pressure of the fuel in the intermediate chamber 75 is less than the opening threshold $S_3$ of the mobile dosing member 60. The mobile sealing member 40 is then open and the fuel can flow into the primary space 45 then through the first outlet 76. The mobile dosing member 60, however, remains closed, and the fuel does not flow through the second outlet 78.

In a third case, corresponding to a phase of operation at medium or at full speed, the pressure of the fuel in the inlet chamber 72 is greater than the opening threshold $S_1$, $S_2$ of the mobile sealing member 40 and the pressure of the fuel in the intermediate chamber 75 is greater than the opening threshold $S_3$ of the mobile dosing member 60. The mobile sealing member 40 is open and the fuel can flow into the primary space 45 then through the first outlet 76. Moreover, the mobile dosing member 60 is also open and the fuel can flow through the intermediate chamber 75, the central recess 60*a*, the slots 69, the downstream chamber 65 and then the second outlet 78.

Figure 5:
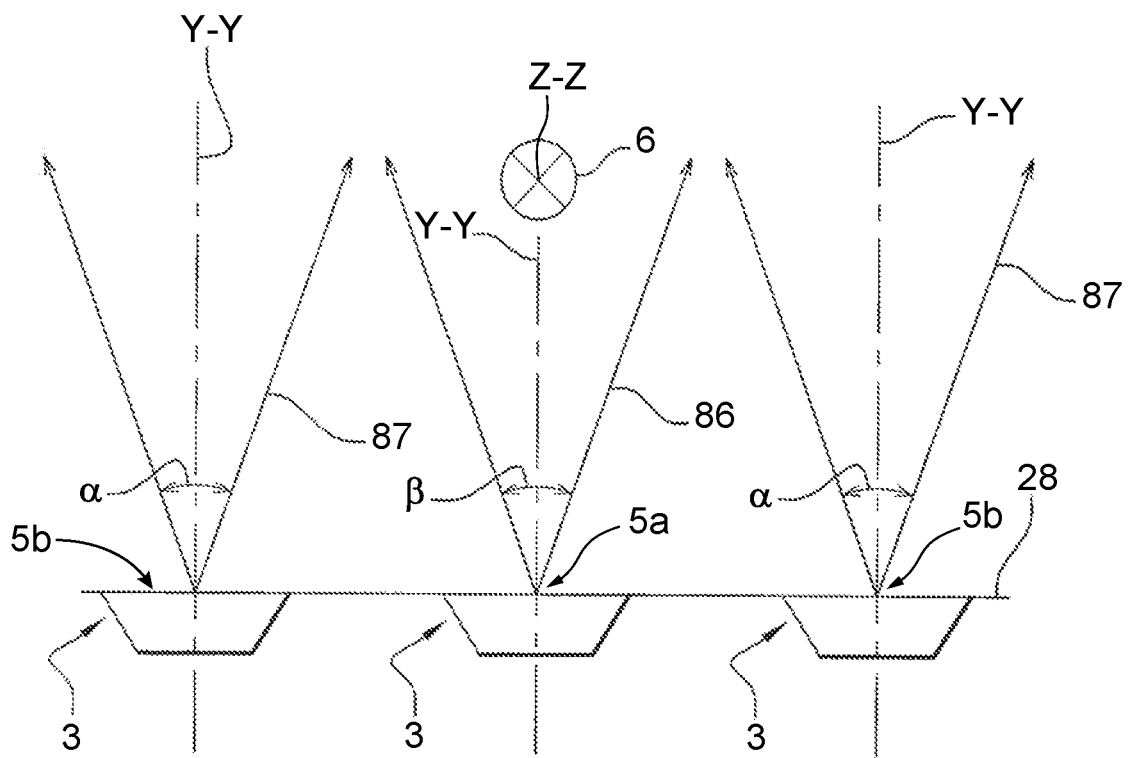
FIG. 5 is a partial schematic view of the clouds of injection of fuel in the combustion chamber according to the invention.

In reference to FIG. 5, the flow rate of fuel injected by each injector 5*a* of the first type is substantially identical to the flow rate of fuel injected by each injector 5*b* of the second type, at least in a steady state.

The flow rate of air for supplying the injection systems 3 of the injectors 5*a* of the first type is substantially identical to that of the injection systems 3 of the injectors 5*b* of the second type.

Each injector 5*a* of the first type is configured to inject fuel that forms a conical cloud 86 of mixture of air and of fuel of mixture of air and of fuel while opening in the downstream direction. This cloud 86 having a spray cone angle β centred on the longitudinal axis Y-Y of the corresponding injection system and in the direction of the adjacent injectors 5.

Each injector 5*b* of the second type is configured to inject fuel that forms a conical cloud 87 of mixture of air and of fuel while opening in the downstream direction. This cloud 87 having a spray cone angle α centred on the longitudinal axis Y-Y of the corresponding injection system and in the direction of the adjacent injectors 5.

The spray cone angle β of the clouds 86 of air-fuel mixture coming from the injectors 5*a* of the first type is substantially equal to the spray cone angle α of the clouds 87 of air-fuel mixture coming from the injectors 5*b* of the second type.

As a result of the equality of the flow rates among the various injectors 5*a*, 5*b* and the equality of the spray cone angles α, β of the clouds, there is a more homogenous distribution of the fuel in the combustion chamber 2 and a reduction in the temperature heterogeneities in the combustion chamber 2.

In general, the lower opening threshold $S_1$ of the mobile sealing member 40 of each injector 5*a* of the first type with respect to the opening threshold $S_2$ of the mobile sealing member 40 of each injector 5*b* of the second type tends to limit the pressure drops in the fuel in the injectors 5*a* of the first type.

The difference in pressure between the pressure of the fuel arriving in the intake opening 71 of an injector 5*a* of the first type and the pressure of the fuel passing through the second outlet 78 of this injector tends to be greater. The size of the drops of fuel injected near the spark plugs 6 tends to be reduced. As a result, there is a better mixture of air and of fuel injected into the combustion chamber 2. The re-ignition of the combustion chamber 2 during flight is thus facilitated.

The opening threshold $S_2$ of the sealing member of each injector 5*b* of the second type is left unchanged. However, the number of injectors 5*b* of the second type is much greater than that of the injectors 5*a* of the first type, because of the small number of spark plugs 6 in modern turbomachines 1. The lowering of the opening threshold $S_1$ of the mobile sealing member 40 of each injector 5*a* of the first type thus has relatively little effect on the system for supplying fuel to the injectors 5. Consequently, the combustion chamber 2 tends to be reignited more easily with rather limited modifications to the turbomachine and in particular to its system for supplying fuel.

Of course, various modifications can be made by a person skilled in the art to the invention described above without going beyond the context of the disclosure of the invention.

Alternatively, the flow rate of fuel injected by each injector 5*a* of the first type is strictly greater than the flow rate of fuel injected by each injector 5*b* of the second type, in order to facilitate even more the re-ignition of the combustion chamber 2 during flight.

In this case, the opening threshold $S_3$ of the mobile dosing member 60 of each injector 5*a* of the first type is in particular strictly less than that of the mobile dosing member 60 of each injector 5*b* of the second type. Moreover or alternatively, the injector nozzle 54 of each injector 5*a* of the first type has an outlet orifice having a greater diameter than that of each injector 5*b* of the second type.

What is claimed is:

1. A combustion chamber for a turbomachine, comprising:
   a spark plug,
   a first fuel injector facing the spark plug,
   a second fuel injector, farther away from the spark plug than the first fuel injector,
   each of the first fuel injector and the second fuel injector comprising:
      an opening for intake of fuel,
      a first fuel outlet,
      a mobile sealing member configured to be mobile between an open position and a closed position, wherein in the open position fuel passes through in a direction of the first fuel outlet and wherein in the closed position the intake opening is plugged by the mobile sealing member, wherein the mobile sealing member is configured to open when a fuel pressure applied to the mobile sealing member exceeds an opening threshold of the mobile sealing member,
      a first elastic return means configured to bias the mobile sealing member towards the closed position,
      a second fuel outlet,
      a mobile dosing member configured to be mobile between an open position wherein fuel passes through the mobile dosing member in a direction of the second fuel outlet and a closed position wherein the circulation of fuel towards the second fuel outlet is prevented,
      a second elastic return means configured to bias the mobile dosing member towards the closed position,
      wherein the mobile dosing member is configured to open when the fuel pressure exceeds an opening threshold of the mobile dosing member that is greater than the opening threshold of the mobile sealing member of the fuel injector, and
      wherein the first fuel outlet fluidly communicates with a primary circuit of the fuel injector, wherein the second fuel outlet fluidly communicates with a secondary circuit of the fuel injector, and
   wherein the opening threshold of the mobile sealing member of the first fuel injector is less than the opening threshold of the mobile sealing member of the second fuel injector.

2. The combustion chamber according to claim 1, wherein the mobile sealing member of the first fuel injector is configured to be open when a pressure of the fuel is greater than the opening threshold of the mobile sealing member of the first fuel injector in order to allow the fuel to supply the primary circuit through the first fuel outlet of the first fuel injector, and wherein the mobile dosing member of the first fuel injector is configured to be open when the pressure of the fuel is greater than the opening threshold of the mobile dosing member of the first fuel injector in order to allow the fuel to supply the secondary circuit of the first fuel injector through the second outlet of the first fuel injector.

3. The combustion chamber according to claim 1, wherein the first elastic return means of the first fuel injector has a stiffness lower than a stiffness of the first elastic return means of the second fuel injector.

4. The combustion chamber according to claim 1, wherein the first elastic return means of each fuel injector comprises a spring.

5. The combustion chamber according to claim 1, wherein the first elastic return means and the second elastic return means of said first fuel injector are arranged around a longitudinal axis of said first fuel injector.

6. The combustion chamber according to claim 1, wherein the opening threshold of the dosing member of the first fuel injector is identical to the opening threshold of the dosing member of the second fuel injector.

7. The combustion chamber according to claim 1, wherein a ratio of a value of the opening threshold of the mobile sealing member of the second fuel injector to a value of the opening threshold of the mobile sealing member of the first fuel injector is between 1.03 and 1.10.

8. The combustion chamber according to claim 1, wherein the first fuel injector is configured to inject fuel in a first cloud having a first spray cone angle, wherein the second fuel injector is configured to inject fuel in a second cloud having a second spray cone angle and wherein the first spray cone angle and the second spray cone angle are equal.

9. The combustion chamber according to claim 1, comprising a first injection system into which the first fuel injector is inserted, and a second injection system into which the second fuel injector is inserted, wherein each injection system comprises at least one air swirler and a dome, wherein the first injection system is identical to the second injection system.

10. A turbomachine comprising a combustion chamber comprising:
a spark plug,
a first fuel injector, located facing the spark plug,
a second fuel injector, farther away from the spark plug than the first fuel injector,
each of the first fuel injector and the second fuel injector comprising:
an opening for intake of fuel,
a first fuel outlet,
a mobile sealing member configured to be mobile between an open position wherein fuel passes through in a direction of the first fuel outlet and a closed position wherein the intake opening is plugged by the mobile sealing member, wherein the mobile sealing member is configured to open when a fuel pressure applied to the mobile sealing member exceeds an opening threshold of the mobile sealing member,
a first elastic return means configured to bias the mobile sealing member towards the closed position,
a second fuel outlet,
a mobile dosing member configured to be mobile between an open position wherein fuel passes through the mobile dosing member in a direction of the second fuel outlet and a closed position wherein the circulation of fuel towards the second fuel outlet is prevented,
a second elastic return means configured to bias the mobile dosing member towards the closed position,
wherein the mobile dosing member is configured to open when the fuel pressure exceeds an opening threshold of the mobile dosing member that is greater than the opening threshold of the mobile sealing member of the fuel injector, and
wherein the first fuel outlet fluidly communicates with a primary circuit of the fuel injector, wherein the second fuel outlet fluidly communicates with a secondary circuit of the fuel injector and
wherein the opening threshold of the mobile sealing member of the first fuel injector is less than the opening threshold of the mobile sealing member of the second fuel injector.

11. The turbomachine according to claim 10, wherein the turbomachine is an aircraft turbomachine.

12. The combustion chamber according to claim 1,
wherein the mobile sealing member of the second fuel injector is configured to be open when a pressure of the fuel is greater than the opening threshold of the mobile sealing member of the second fuel injector in order to allow the fuel to supply the primary circuit through the first outlet of the second fuel injector, and wherein the mobile dosing member of the second fuel injector is configured to be open when the pressure of the fuel is greater than the opening threshold of the mobile dosing member of the second fuel injector in order to allow the fuel to supply the secondary circuit of the second fuel injector through the second outlet of the second fuel injector.

13. The combustion chamber according to claim 1, wherein the second elastic return means of each fuel injector comprises a spring.

14. The combustion chamber according to claim 1, wherein the first elastic return means and the second elastic return means of said second fuel injector are arranged around a longitudinal axis of the second fuel injector.

15. The combustion chamber according to claim 1, wherein the first fuel injector is configured to inject, in a steady state, a first flow rate of fuel, wherein the second fuel injector is configured to inject, in the steady state, a second flow rate of fuel, and wherein the first flow rate and the second flow rate are identical.

* * * * *